US012142828B2

(12) United States Patent
Matsushima et al.

(10) Patent No.: US 12,142,828 B2
(45) Date of Patent: Nov. 12, 2024

(54) ANTENNA DEVICE

(71) Applicant: AISIN CORPORATION, Kariya (JP)

(72) Inventors: Masaki Matsushima, Kariya (JP); Nobuyasu Miwa, Kariya (JP); Michihiro Ogura, Kariya (JP); Hiroaki Yamamoto, Kariya (JP); Kaoru Nakagaki, Kariya (JP)

(73) Assignee: AISIN CORPORATION, Kariya (JP)

( * ) Notice: Subject to any disclaimer, the term of this patent is extended or adjusted under 35 U.S.C. 154(b) by 129 days.

(21) Appl. No.: 17/933,672

(22) Filed: Sep. 20, 2022

(65) Prior Publication Data

US 2023/0145638 A1 May 11, 2023

(30) Foreign Application Priority Data

Nov. 10, 2021 (JP) ................................ 2021-183246

(51) Int. Cl.
*H01Q 1/36* (2006.01)
*H01Q 1/48* (2006.01)
*H01Q 9/04* (2006.01)

(52) U.S. Cl.
CPC ............. *H01Q 1/48* (2013.01); *H01Q 9/0407* (2013.01); *H01Q 9/0428* (2013.01)

(58) Field of Classification Search
CPC .. H01Q 1/36; H01Q 1/38; H01Q 1/48; H01Q 9/04; H01Q 9/0428; H01Q 9/0407; H01Q 9/40; H01Q 9/42
See application file for complete search history.

(56) References Cited

U.S. PATENT DOCUMENTS

| | | | | |
|---|---|---|---|---|
| 8,174,457 B1 * | 5/2012 | Lam | H01Q 9/42 343/846 |
| 2008/0079635 A1 * | 4/2008 | Rowell | H01Q 1/243 343/702 |
| 2016/0049732 A1 * | 2/2016 | Huang | H01Q 5/378 216/13 |
| 2019/0044224 A1 | 2/2019 | Kim | |
| 2021/0280970 A1 * | 9/2021 | Ueda | H01Q 21/29 |

FOREIGN PATENT DOCUMENTS

| | | |
|---|---|---|
| JP | 2009-225068 A | 10/2009 |
| JP | 2016-116016 A | 6/2016 |
| WO | WO 2017/138800 A1 | 8/2017 |

* cited by examiner

*Primary Examiner* — Thai Pham
(74) *Attorney, Agent, or Firm* — Oblon, McClelland, Maier & Neustadt, L.L.P.

(57) ABSTRACT

An antenna device includes a ground portion including a linear portion connecting a first point and a second point to each other along a first direction parallel to a surface of a substrate, on one side in a second direction orthogonal to the first direction, a power feeding portion provided in a first range including the first point, and an element portion configured to receive power from the power feeding portion and formed in a conductor portion of the substrate that is insulated from the ground portion in a state in which the element portion protrudes from the first range toward the other side in the second direction. The element portion includes a first element portion protruding in the first range toward the other side in the second direction, and a second element portion extending along the first direction from the first element portion toward the second point.

8 Claims, 8 Drawing Sheets

CHARGE DISTRIBUTION (PHASE OF 60 DEGREES)
10A(10)
17
13
C
30
E−
E+
E−

CHARGE DISTRIBUTION (PHASE OF 150 DEGREES)
10A(10)
17
13
C
30
E+
E−
E−

CHARGE DISTRIBUTION (PHASE OF 240 DEGREES)
10A(10)
17
13
C
30
E+
E−
E+

CHARGE DISTRIBUTION (PHASE OF 330 DEGREES)
10A(10)
17
13
C
30
E−
E+
E+

CHARGE DISTRIBUTION
(PHASE OF 60 DEGREES)
12
10
E+
C
30
E−
20
E+
11

CHARGE DISTRIBUTION
(PHASE OF 150 DEGREES)
12
10
E+
C
30
E−
20
E−
11

CHARGE DISTRIBUTION
(PHASE OF 240 DEGREES)
12
10
E−
C
30
E+
20
E−
11

CHARGE DISTRIBUTION
(PHASE OF 330 DEGREES)
12
10
E−
C
30
E+
20
E+
11

ANTENNA DEVICE

CROSS REFERENCE TO RELATED APPLICATIONS

This application is based on and claims priority under 35 U.S.C. § 119 to Japanese Patent Application 2021-183246, filed on Nov. 10, 2021, the entire content of which is incorporated herein by reference.

TECHNICAL FIELD

This disclosure relates to an antenna device.

BACKGROUND DISCUSSION

In related art, an antenna device is used for transmission and reception of radio waves. Techniques related to such an antenna device include, for example, those disclosed in JP 2009-225068A (Reference 1), JP 2016-116016A (Reference 2) and WO 2017/138800 (Reference 3).

Reference 1 discloses a circularly polarized composite monopole antenna. The circularly polarized composite monopole antenna includes a ground plate formed of a plate-shaped conductor, and the ground plate is provided with a power feeding element and a parasitic element formed by bending in an inverted L shape. The power feeding element and the parasitic element are erected from the ground plate by allowing a rising side of the power feeding element and a rising side of the parasitic element to pass through a through hole formed in a dielectric on the ground plate.

Reference 2 discloses a wide-band circularly polarized wave antenna. The wide-band circularly polarized wave antenna is implemented such that a first antenna element and a second antenna element both having a trapezoidal shape are arranged point-symmetrically with respect to a power feeding portion.

Reference 3 discloses a monopole antenna. The monopole antenna includes a circular disk-shaped coplanar waveguide transmission line.

In the technique disclosed in Reference 1, since the power feeding element and the parasitic element are formed in a state of being erected from the ground plate via the dielectric, a three-dimensional shape is formed. Therefore, the antenna device may not be used when there is a height limit in a region where the antenna device is disposed. Since the technique disclosed in Reference 2 is a so-called parallel antenna device, a pair of antenna elements are required. Therefore, an area occupied by the antenna device increases. As described above, the techniques disclosed in References 1 and 2 have room for improvement in reducing a size of the antenna device.

Polarized radio waves include, for example, horizontally polarized waves, vertically polarized waves, and circularly polarized waves. The technique disclosed in Reference 3 is a technique related to the monopole antenna, and thus can be used only for transmission and reception of one of the vertically polarized radio waves and the horizontally polarized radio waves. Therefore, the technique disclosed in Reference 3 cannot be used for transmission and reception of the circularly polarized radio waves.

A need thus exists for an antenna device which is not susceptible to the drawback mentioned above.

SUMMARY

A characteristic configuration of an antenna device according to this disclosure is an antenna device including: a ground portion including a linear portion connecting a first point and a second point to each other along a predetermined first direction parallel to a surface of a substrate, the ground portion being formed by grounding a conductor portion of the substrate on one side in a second direction orthogonal to the first direction and parallel to the surface of the substrate; a power feeding portion provided in a first range including the first point among the first range, a second range, and a third range that are obtained by dividing the linear portion of the ground portion into three equal parts along the first direction; and an element portion configured to receive power from the power feeding portion and formed in a conductor portion of the substrate that is insulated from the ground portion in a state in which the element portion protrudes from the first range toward the other side in the second direction with respect to the linear portion. The element portion includes a first element portion protruding from the linear portion in the first range toward the other side in the second direction, and a second element portion extending along the first direction from the first element portion toward the second point, spaced apart from the linear portion toward the other side in the second direction, and having at least one linear side.

BRIEF DESCRIPTION OF THE DRAWINGS

The foregoing and additional features and characteristics of this disclosure will become more apparent from the following detailed description considered with the reference to the accompanying drawings, wherein.

DETAILED DESCRIPTION

An antenna device according to this disclosure is configured to transmit and receive circularly polarized radio waves. Hereinafter, an antenna device 1 according to the present embodiment will be described.

Figure 1:
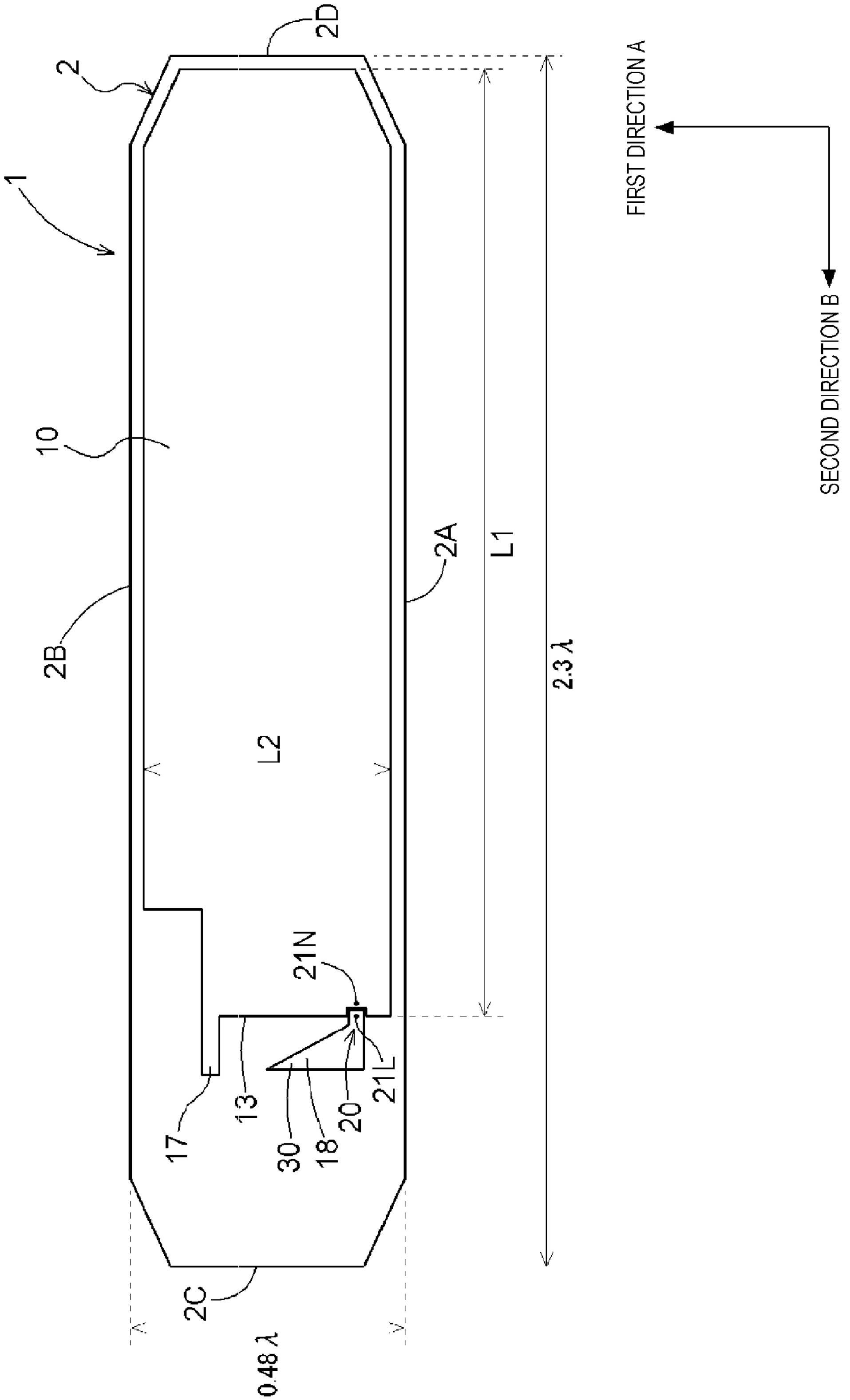
FIG. 1 is a plan view of a substrate on which an antenna device is provided.
Figure 2:
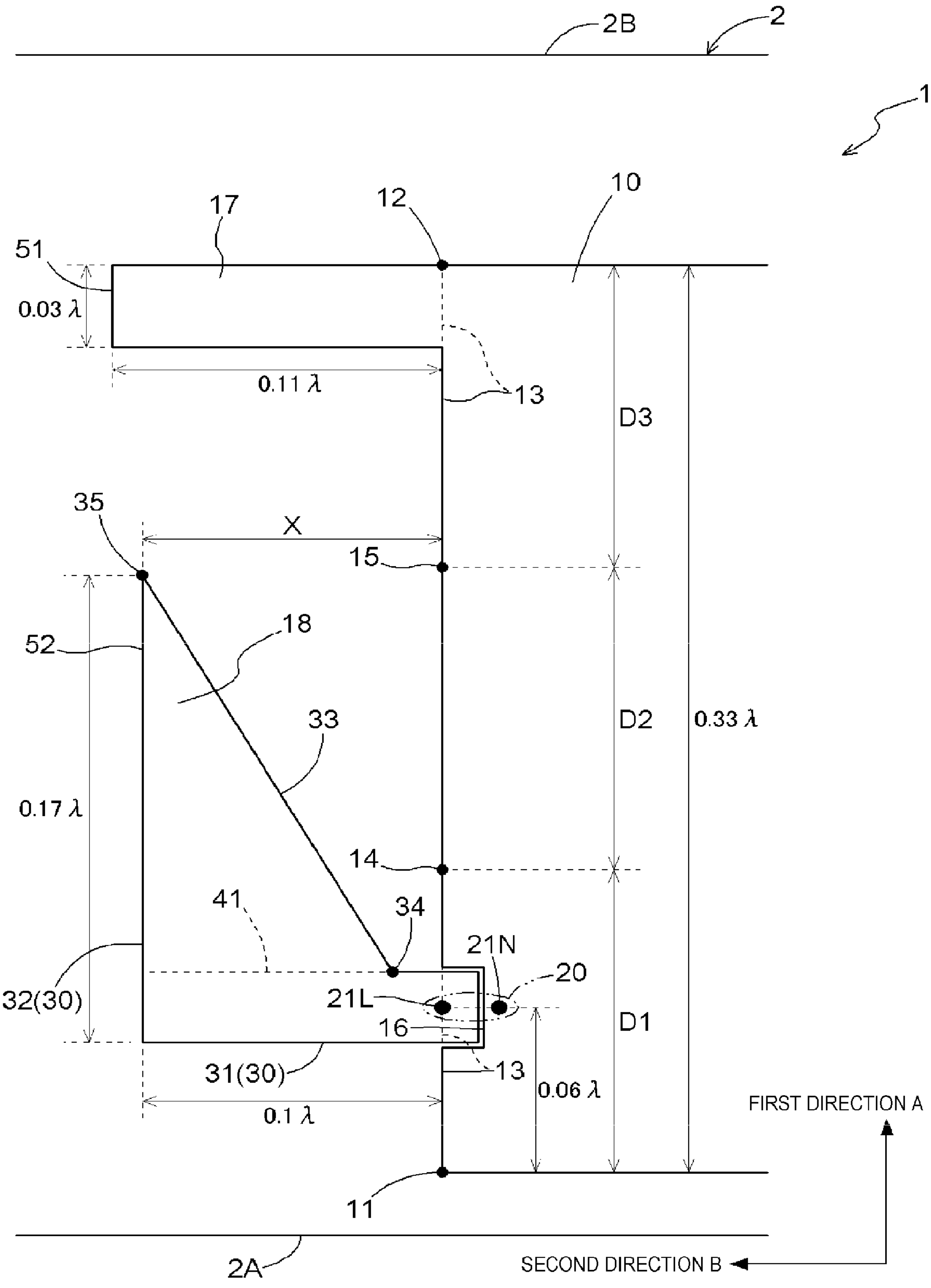
FIG. 2 is an enlarged view of the antenna device.

The antenna device 1 is provided on a substrate 2. FIG. 1 shows a plan view of the substrate 2. FIG. 2 shows an enlarged view of the vicinity of a power feeding portion 20. Here, in the following description, a predetermined direction parallel to a surface of the substrate 2 is referred to as a first direction A, and a direction orthogonal to the first direction A and parallel to the surface of the substrate 2 is referred to as a second direction B. In the present embodiment, the substrate 2 is formed in a rectangular shape with chamfered corners. In the present embodiment, the first direction A is a direction along a direction (hereinafter referred to as a lateral direction) in which short sides of the rectangular substrate 2 extend, and the second direction B is a direction along a direction (hereinafter referred to as a longitudinal direction) in which long sides of the rectangular substrate 2 extend.

When a wavelength corresponding to the highest frequency in a frequency band used in the antenna device 1 is λ, a length of the substrate 2 along the first direction A is 0.48λ, and a length of the substrate 2 along the second direction B is 2.3λ in the present embodiment.

As shown in FIG. 1, the antenna device 1 includes a ground portion 10, a power feeding portion 20, and an element portion 30.

As shown in FIG. 2, the ground portion 10 includes a linear portion 13 connecting a first point 11 and a second point 12 to each other along the first direction A, and is formed by grounding a conductor portion of the substrate 2 on one side in the second direction B. The linear portion 13 connecting the first point 11 and the second point 12 along the first direction A means that the linear portion 13 is parallel to the first direction A and the first point 11 and the second point 12 are present on the linear portion 13. In the present embodiment, the first point 11 is set at a position spaced apart from an outer edge portion 2A of the substrate 2 on one side in the first direction A toward a center side of the substrate 2 along the first direction A, and the second point 12 is set at a position spaced apart from an outer edge portion 2B of the substrate 2 on the other side in the first direction A toward the center side of the substrate 2 along the first direction A. Therefore, the first point 11 and the second point 12 are set at positions that approaches the center side of the substrate 2 along the first direction A from the outer edge portion 2A and the outer edge portion 2B, respectively. The linear portion 13 corresponds to a line virtually connecting the first point 11 and the second point 12 as described above. The first point 11 and the second point 12 are not provided as actually drawn points on the substrate 2, but are defined to facilitate understanding of the linear portion 13.

The one side in the second direction B is one end portion side of both end portions of the substrate 2 in the longitudinal direction. That is, in an example in FIG. 1, the one side in the second direction B is the outer edge portion side of one of an outer edge portion 2C and an outer edge portion 2D of the substrate 2. In the present embodiment, the one side in the second direction B is an outer edge portion 2D side in the outer edge portion 2C and the outer edge portion 2D of the substrate 2.

Here, the substrate 2 is formed by laminating a conductor and a dielectric. The conductor portion of the substrate 2 corresponds to the conductor that is laminated with such a dielectric to form the substrate 2. The ground portion 10 is formed by patterning such a conductor portion of the substrate 2 so as to include the linear portion 13, and is grounded. The linear portion 13 virtually connects the first point 11 set at the position spaced apart from the outer edge portion 2A of the substrate 2 on the one side in the first direction A toward the center side of the substrate 2 along the first direction A, and the second point 12 set at the position spaced apart from the outer edge portion 2B of the substrate 2 on the other side in the first direction A toward the center side of the substrate 2 along the first direction A.

In the present embodiment, the ground portion 10 includes a protruding portion 17 protruding from a second point 12 side of the linear portion 13 toward the other side in the second direction B with a predetermined width. The second point 12 side of the linear portion 13 means a side that is closer to the second point 12 than is a central portion of the linear portion 13 between the first point 11 and the second point 12.

Here, as described above, the linear portion 13 is provided between the first point 11 and the second point 12. The linear portion 13 is divided into three equal parts along the first direction A, and the three equal parts are referred to as a first range D1, a second range D2, and a third range D3. In this case, two points are required between the first point 11 and the second point 12. Of the two points, when a point closer to the first point 11 is referred to as a first auxiliary point 14 and a point closer to the second point 12 is referred to as a second auxiliary point 15, a portion of the linear portion 13 between the first point 11 and the first auxiliary point 14 corresponds to the first range D1. A portion of the linear portion 13 between the first auxiliary point 14 and the second auxiliary point 15 corresponds to the second range D2, and a portion of the linear portion 13 between the second auxiliary point 15 and the second point 12 corresponds to the third range D3.

In the present embodiment, the protruding portion 17 having the predetermined width and protruding toward the other side in the second direction B is provided in the third range D3 that is a range between the second auxiliary point 15 and the second point 12. The predetermined width is a width set according to a frequency of the radio waves transmitted and received by the antenna device 1. The other side in the second direction B is an outer edge portion 2C side as viewed from the linear portion 13 along the first direction A. Therefore, the ground portion 10 includes the protruding portion 17 protruding from the third range D3, which is the range between the second auxiliary point 15 and the second point 12, toward the outer edge portion 2C side, with the width set according to the frequency of the radio waves transmitted and received by the antenna device 1, as viewed from the linear portion 13 along the first direction A. In the present embodiment, the protruding portion 17 is formed in a rectangular shape in which a side along the first direction A is a short side and a side along the second direction B is a long side. In the shape of the protruding portion 17, a corner portion on an outer edge portion 2B side and an outer edge portion 2D side coincides with the second point 12. Similar to the ground portion 10, such a protruding portion 17 is formed by patterning a conductor portion of the substrate 2, and is formed of a conductor having the same potential in terms of direct current as a portion of the ground portion 10 formed on the one side with respect to the linear portion 13 in the second direction B.

As shown in FIG. 1, in the present embodiment, the ground portion 10 is formed such that the length along the second direction B is greater than the length along the first direction A. The length along the second direction B is a length of the ground portion 10 along the second direction B, and in the present embodiment, is a length L1 from the linear portion 13 to an end portion of the ground portion 10 on the outer edge portion 2D side. The length along the first direction A is a length of the ground portion 10 along the first direction A, and in the present embodiment, is a length L2 from an end portion of the ground portion 10 on an outer edge portion 2A side to an end portion of the ground portion 10 on the outer edge portion 2B side. In FIG. 1, the ground portion 10 is formed such that a length of the linear portion 13 along the first direction A is smaller than the length L2, but the length of the linear portion 13 along the first direction A may be formed to be the length L2.

In the present embodiment, a distance between the first point 11 and the second point 12 is 0.33λ, a length of the protruding portion 17 along the first direction A is 0.03λ, and a length of the protruding portion 17 along the second direction B is 0.11λ.

The power feeding portion 20 is provided in the first range D1 including the first point 11 among the first range D1, the second range D2, and the third range D3 that are obtained by dividing the linear portion 13 of the ground portion 10 into three equal parts along the first direction A. The first range D1 is between the first point 11 and the first auxiliary point 14 in the linear portion 13. The power feeding portion 20 is provided in the first range D1. The power feeding portion 20 feeds power to the ground portion 10 described above and the element portion 30 to be described later such that the antenna device 1 transmits and receives radio waves propagating in the air. Specifically, the power feeding portion 20 applies a reference potential (0 V) from a power feeding point 21N to (grounds) the ground portion 10, and applies AC power of a predetermined frequency from a power feeding point 21L to the element portion 30. Therefore, the power feeding portion 20 is provided in the first range D1 of the linear portion 13 between the first point 11 and the first auxiliary point 14, applies the reference potential (0 V) to (grounds) the ground portion 10, and applies AC power of the predetermined frequency to the element portion 30. In the present embodiment, the power feeding point 21N and the power feeding point 21L are provided at positions that are 0.06λ away from the first point 11.

The element portion 30 receives power from the power feeding portion 20 and is formed in a conductor portion of the substrate 2 that is insulated from the ground portion 10 in a state in which the element portion 30 protrudes from the first range D1 toward the other side with respect to the linear portion 13 in the second direction B. "Receiving power from the power feeding portion 20" means receiving power fed from the power feeding portion 20 as described above. The first range D1 is a range from the first point 11 to the first auxiliary point 14 in the linear portion 13. The state in which the element portion 30 protrudes toward the other side with respect to the linear portion 13 in the second direction B means a state in which the element portion 30 protrudes from the linear portion 13 toward a side opposite to the ground portion 10 provided on the outer edge portion 2D side of the substrate 2 with respect to the linear portion 13, that is, toward the outer edge portion 2C side of the substrate 2 with respect to the linear portion 13, on the one side with respect to the linear portion 13 in the second direction B. The conductor portion of the substrate 2 that is insulated from the ground portion 10 refers to a conductor portion formed by patterning in a manner of being spaced apart, with a predetermined insulation distance, from the ground portion 10 formed by patterning the conductor portion of the substrate 2. Therefore, the element portion 30 receives power from the power feeding portion 20 at the power feeding point 21L and is formed in the conductor portion formed by patterning in a manner of being spaced apart, with the predetermined insulation distance, from the ground portion 10 formed by patterning the conductor portion of the substrate 2, in a state in which the element portion 30 protrudes from the linear portion 13 in a range of the linear portion 13 from the first point 11 to the first auxiliary point 14, toward the outer edge portion 2C side of the substrate 2 with respect to the linear portion 13.

In the present embodiment, the power feeding point 21L at which power is fed from the power feeding portion 20 to the element portion 30 is provided on the linear portion 13, and the element portion 30 includes a portion protruding toward the one side in the second direction B from the power feeding point 21L. Therefore, the ground portion 10 is formed by cutting in a manner of surrounding the portion of the element portion 30 including the power feeding point 21L. That is, the ground portion 10 includes a cutout portion 16 in the first range D1. In the element portion 30, the power feeding point 21L at which power is fed from the power feeding portion 20 may be provided on the other side with respect to the linear portion 13 in the second direction B, or may be provided on the one side with respect to the linear portion 13 in the second direction B.

The element portion 30 includes a first element portion 31 and a second element portion 32. The first element portion 31 protrudes from the first range D1 toward the other side in the second direction B. The first range D1 is the range between the first point 11 and the first auxiliary point 14 in the linear portion 13, and the first range D1 is provided with the power feeding point 21L of the element portion 30, at which power is fed from the power feeding portion 20. The other side in the second direction B is the outer edge portion 2C side of the substrate 2 as viewed from the linear portion 13. Therefore, the first element portion 31 includes the power feeding point 21L at which power is fed from the power feeding portion 20, and protrudes from the first range D1, which is the range between the first point 11 and the first auxiliary point 14 in the linear portion 13, toward the outer edge portion 2C side of the substrate 2 as viewed from the linear portion 13. In the present embodiment, as shown in FIG. 2, the first element portion 31 has a width corresponding to the cutout portion 16, and is formed in a rectangular shape in which a side along the first direction A is a short side and a side along the second direction B is a long side.

The second element portion 32 extends along the first direction A from the first element portion 31 toward the second point 12. As described above, the first element portion 31 protrudes from the first range D1 toward the outer edge portion 2C side of the substrate 2 as viewed from the linear portion 13. "Along the first direction A" means "so as to have a portion parallel to the linear portion 13". "Toward the second point 12" means "toward the outer edge portion 2B side of the substrate 2 as viewed from the first element portion 31". Therefore, the second element portion 32 extends from the first element portion 31, which protrudes from the first range D1 toward the outer edge portion 2C side of the substrate 2 when viewed from the linear portion 13, toward the outer edge portion 2B side of the substrate 2 when viewed from the first element portion 31 so as to have the portion parallel to the linear portion 13. Therefore, the second element portion 32 extends, along the second direction B, from a portion 41 of the rectangular first element portion 31 on the outer edge portion 2B side.

In the present embodiment, the ground portion 10 includes the protruding portion 17. As shown in FIG. 2, an outer edge 51 of the protruding portion 17 on the outer edge portion 2C side is closer to the outer edge portion 2C of the substrate 2 in the second direction B than is an outer edge 52 of the second element portion 32 on the outer edge portion 2C side. In the present embodiment, the second element portion 32 extends from the first element portion 31 toward the protruding portion 17.

The first element portion 31 and the second element portion 32 described above are formed by patterning one conductor portion. Therefore, the first element portion 31 and the second element portion 32 are formed of conductors having the same potential in terms of direct current.

In the present embodiment, the second element portion 32 is gradually spaced apart from the linear portion 13 as the second element portion 32 approaches the second point 12 from the first element portion 31. "As the second element portion 32 approaches the second point 12 from the first element portion 31" means "as the second element portion 32 approaches the protruding portion 17 from the first element portion 31" in the present embodiment. "Gradually spaced apart from the linear portion 13" means that an outer edge portion 33 of the second element portion 32 on a linear portion 13 side is formed such that a distance between the outer edge portion 33 and the linear portion 13 gradually increases from a boundary portion 34 with the first element portion 31 along the first direction A to a closest portion 35 of the second element portion 32 closest to the protruding portion 17. Therefore, the outer edge portion 33 of the second element portion 32 on the linear portion 13 side is formed such that the distance between the outer edge portion 33 and the linear portion 13 gradually increases as the second element portion 32 approaches the protruding portion 17 from the first element portion 31.

In the present embodiment, the second element portion 32 is formed in a right-angled triangular shape, and a right-angled corner portion of the second element portion 32 coincides with a corner portion of the rectangular first element portion 31 on the outer edge portion 2B side and the outer edge portion 2C side. One of two sides of the right-angled triangle sandwiching the corner portion coincides with a side (portion 41) of the first element portion 31 on the outer edge portion 2B side, and the other of the two sides of the right-angled triangle sandwiching the corner portion is parallel to the linear portion 13. Therefore, an oblique side (corresponding to the outer edge portion 33) of the right-angled triangle faces the linear portion 13 side. Accordingly, as described above, the second element portion 32 can be formed such that the distance between the outer edge portion 33 and the linear portion 13 gradually increases as the second element portion 32 approaches the protruding portion 17 from the first element portion 31.

In other words, the second element portion 32 includes a reduced width portion 18 in which a width along an orthogonal direction orthogonal to an extending direction of the second element portion 32 extending from the first element portion 31 gradually decreases as the second element portion 32 approaches the second point 12 from the first element portion 31. The extending direction extending from the first element portion 31 is the first direction A. Therefore, the orthogonal direction orthogonal to the extending direction extending from the first element portion 31 corresponds to the second direction B orthogonal to the first direction A. Therefore, the second element portion 32 is formed such that the width along the second direction B gradually decreases as the second element portion 32 approaches the second point 12 from the first element portion 31. Such a portion may also be referred to as the reduced width portion 18.

In the present embodiment, a length of the element portion 30 along the first direction A is 0.17λ, and a length of the element portion 30 along the second direction B is 0·1λ. A distance X between an end portion of the reduced width portion 18 closest to the protruding portion 17 (closest portion 35) and the linear portion 13 may be equal to or greater than 0.04λ (preferably equal to or greater than 0.06λ).

FIGS. 3A to 3D show charge distribution generated between the ground portion 10 and the element portion 30 when power is fed to the ground portion 10 and the element portion 30 in the antenna device 1 formed as described above.

Figures 3A, 3B, 3C, 3D:
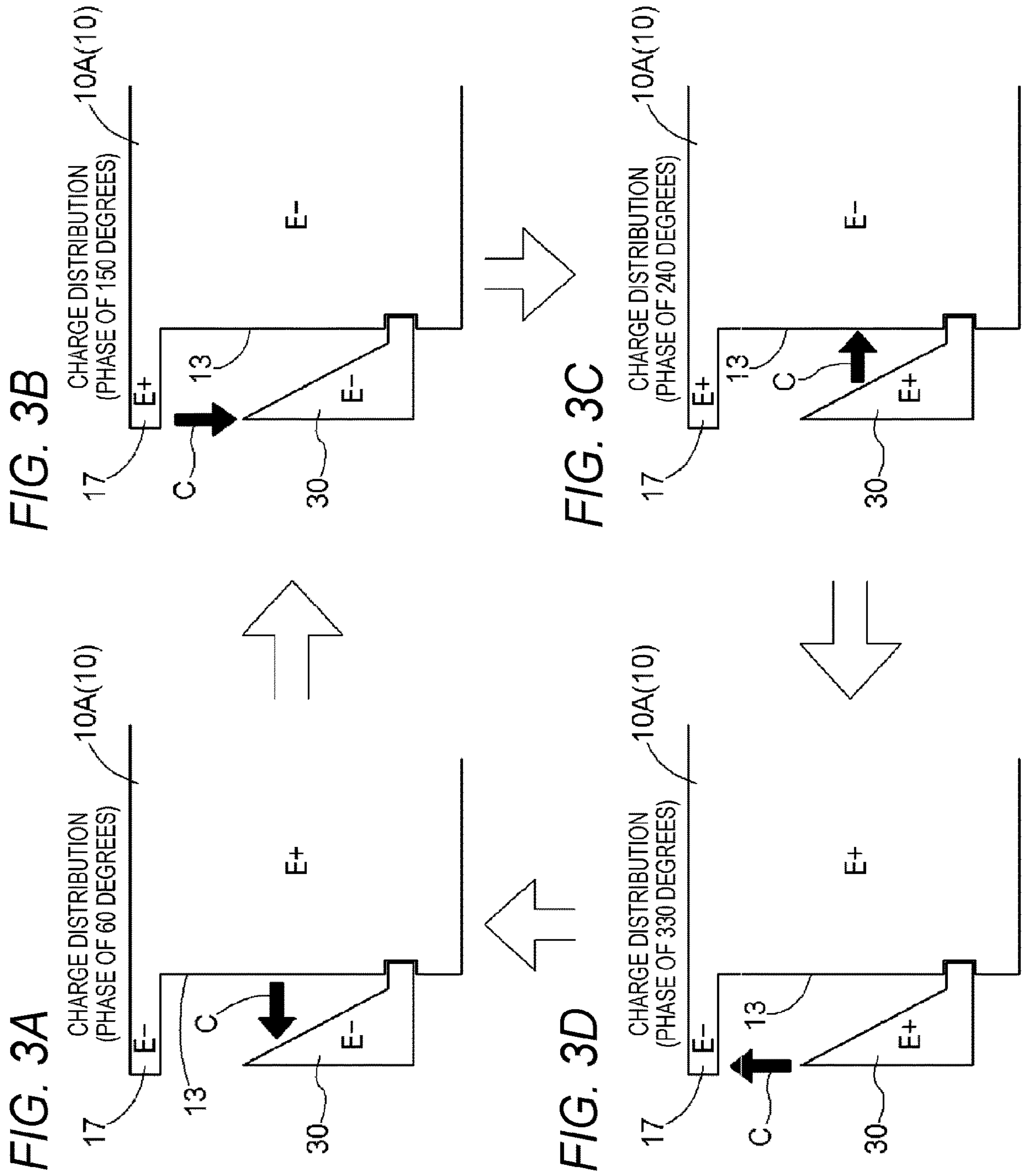
FIGS. 3A to 3D are diagrams showing charge distribution in the antenna device.

As described above, the power feeding portion 20 grounds the ground portion 10 and feeds AC power to the element portion 30. FIG. 3A shows the charge distribution when a phase of the AC power is 60 degrees. In this case, a portion of the ground portion 10 on a side opposite to a side where the element portion 30 protrudes from the linear portion 13 (referred to as a ground main body 10A) is positively charged, while the protruding portion 17 and the element portion 30 are negatively charged. In FIGS. 3A to 3D, a positively charged state is indicated by E+, and a negatively charged state is indicated by E−. Therefore, an electric field in a direction from the ground main body 10A toward the element portion 30 is generated between the ground main body 10A and the element portion 30 as indicated by an arrow C.

FIG. 3B shows the charge distribution when the phase of the AC power is 150 degrees. In this case, the protruding portion 17 is positively charged, and the ground main body 10A and the element portion 30 are negatively charged. Therefore, an electric field in a direction from the protruding portion 17 toward the element portion 30 is generated between the protruding portion 17 and the element portion 30 as indicated by the arrow C.

FIG. 3C shows the charge distribution when the phase of the AC power is 240 degrees. In this case, the protruding portion 17 and the element portion 30 are positively charged, and the ground main body 10A is negatively charged. Therefore, an electric field in a direction from the element portion 30 toward the ground main body 10A is generated between the ground main body 10A and the element portion 30 as indicated by the arrow C.

FIG. 3D shows the charge distribution when the phase of the AC power is 330 degrees. In this case, the ground main body 10A and the element portion 30 are positively charged, and the protruding portion 17 is negatively charged. Therefore, an electric field in a direction from the element portion 30 toward the protruding portion 17 is generated between the protruding portion 17 and the element portion 30 as indicated by the arrow C.

Figures 4A, 4B, 4C:
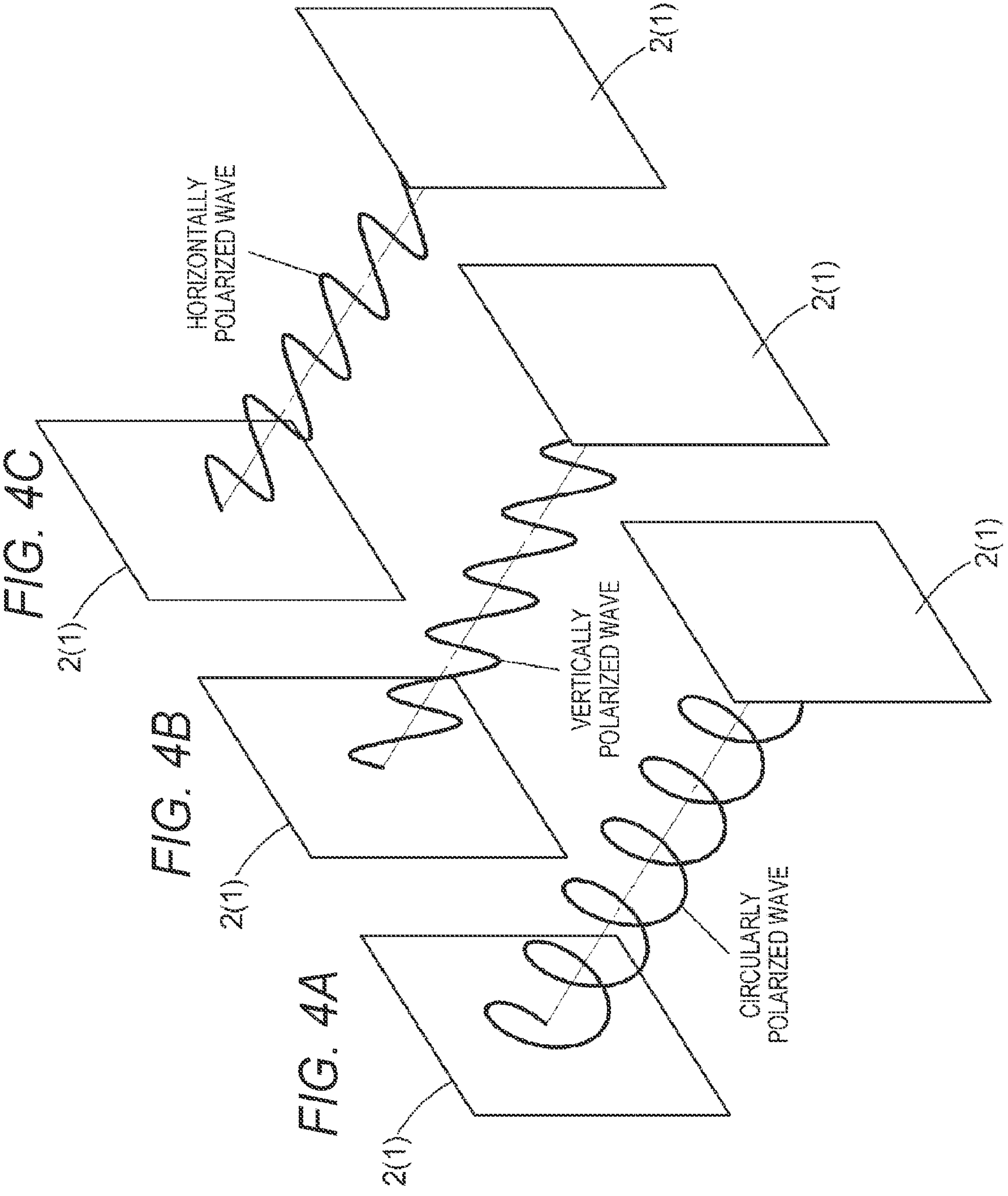
FIGS. 4A to 4C are diagrams showing radio waves radiated by the antenna device.

By continuously feeding such AC power, an electric field rotating about an axis along a direction orthogonal to both the first direction A and the second direction B as a rotation axis can be generated from the substrate 2. Therefore, by erecting the substrate 2, it is possible to transmit and receive circularly polarized radio waves as shown in FIG. 4A. When the antenna device 1 is used as a reception antenna device, it is possible to receive vertically polarized radio waves as shown in FIG. 4B, and to receive horizontally polarized radio waves as shown in FIG. 4C. When the antenna device 1 is used as a transmission antenna device, an antenna device capable of receiving only the vertically polarized radio waves as shown in FIG. 4B can receive radio waves transmitted from the antenna device 1, and an antenna device capable of receiving only the horizontally polarized radio waves as shown in FIG. 4C can receive radio waves transmitted from the antenna device 1.

Figure 5:
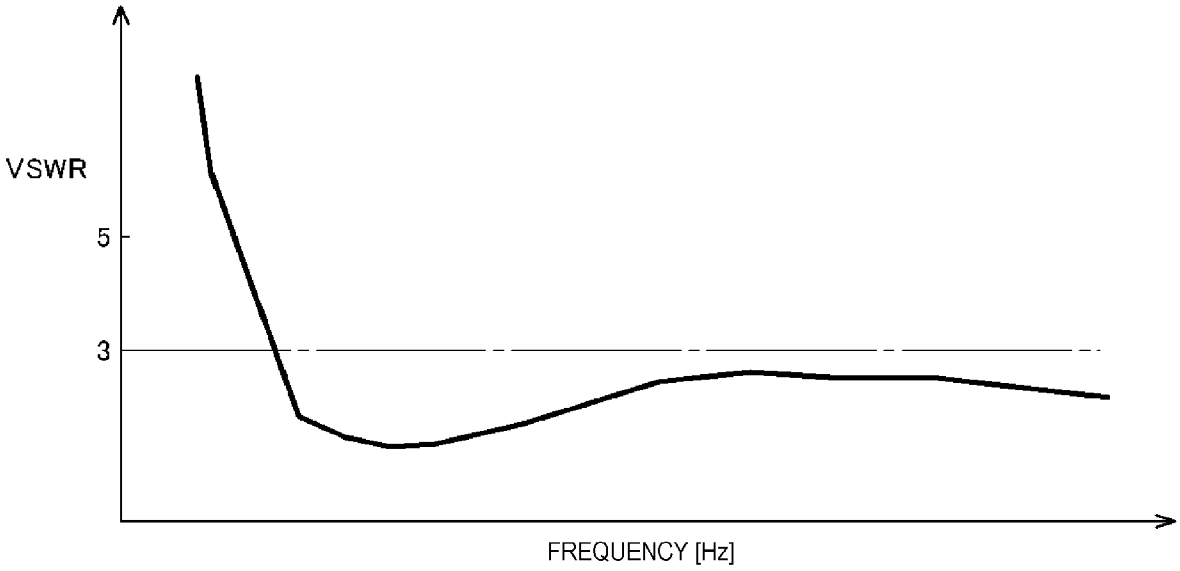
FIG. 5 shows VSWR data of the antenna device.

FIG. 5 shows VSWR characteristics of the antenna device 1. In FIG. 5, a vertical axis represents a VSWR value, and a horizontal axis represents a frequency. In general, an antenna device is desired to have a VSWR value of 3 or smaller. With a configuration described above, it is possible to implement the antenna device 1 having a VSWR value of 3 or smaller in a wide frequency range as shown in FIG. 5.

OTHER EMBODIMENTS

Figures 6A, 6B, 6C, 6D, 6E, 6F, 6G, 6H:
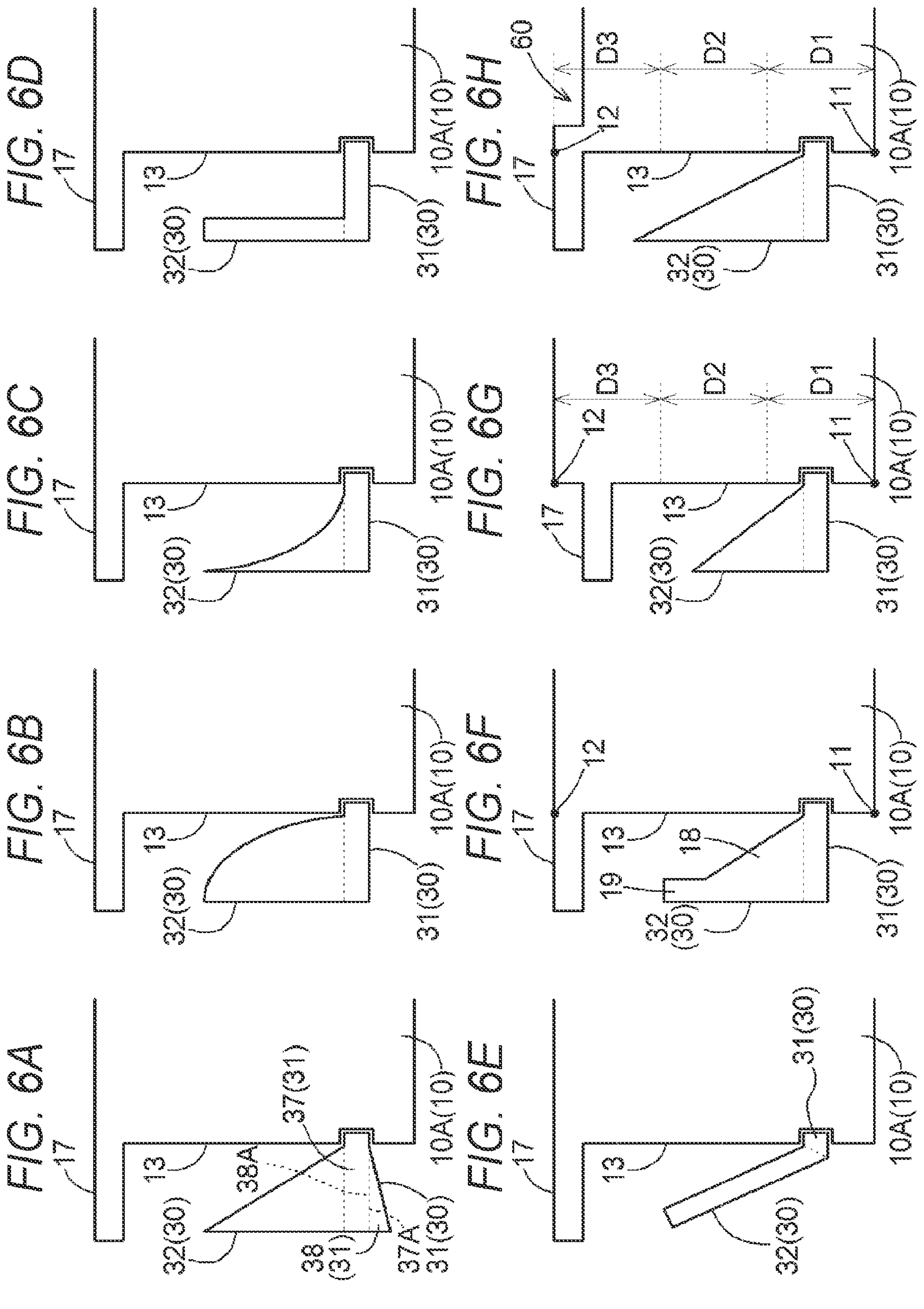
FIGS. 6A to 6H are plan views of antenna devices according to other embodiments.

In the above embodiment, the element portion 30 includes the first element portion 31 having the rectangular shape in a plan view and the second element portion 32 having the right-angled triangular shape in the plan view. For example, as shown in FIG. 6A, the first element portion 31 may include a rectangular first portion 37 and a triangular second portion 38 in a plan view. In this case, an edge portion 37A of the first portion on the outer edge portion 2A side and an edge portion 38A of the second portion on the outer edge portion 2B side may coincide with each other.

As shown in FIG. 6B, the second element portion 32 may have a shape in which a central angle of an elliptical shape is 90 degrees in a plan view. In this case, an arc-shaped portion may face the linear portion 13. The convex arc-shaped portion in FIG. 6B may be formed in a concave shape as shown in FIG. 6C.

The second element portion 32 may have a quadrangular shape in a plan view. In this case, as shown in FIG. 6D, the second element portion 32 may extend toward the protruding portion 17 along the first direction A from the first element portion 31 on the outer edge portion 2C side of the substrate 2. As shown in FIG. 6E, a length of the first element portion 31 along the second direction B may be approximately on the linear portion 13, and the second element portion 32 may have a quadrangular shape in a plan view from the first element portion 31 toward the protruding portion 17.

As shown in FIG. 6F, the second element portion 32 may include a constant width portion 19 that is electrically connected to the reduced width portion 18 on a second point 12 side of the reduced width portion 18 and has a constant width. The reduced width portion 18 is a portion in which a width along the second direction B gradually decreases as the reduced width portion 18 approaches the second point 12 from the first element portion 31. The constant width portion 19 having the constant width along the second direction B may be provided on a side of the reduced width portion 18 opposite to the first element portion 31 in the first direction A, that is, on a side close to the protruding portion 17 in the first direction A.

In the above embodiments, the protruding portion 17 is described as being provided such that a corner portion on the outer edge portion 2B side and the outer edge portion 2D side coincides with the second point 12, but the protruding portion 17 may be provided such that the corner portion on the outer edge portion 2B side and the outer edge portion 2D side of the substrate 2 does not coincide with the second point 12. In this case, as shown in FIG. 6G, a corner portion of the protruding portion 17 on the outer edge portion 2B side and the outer edge portion 2D side of the substrate 2 may be spaced apart from the second point 12 toward the first point 11 of the linear portion 13 along the first direction A. However, it is preferable that the protruding portion 17 is within the third range D3. As shown in FIG. 6H, the ground portion 10 may be formed such that the protruding portion 17 on the outer edge portion 2D side has a cutout portion 60 along a width of the protruding portion 17. Also in this case, it is preferable that the protruding portion 17 is within the third range D3.

Figure 7:
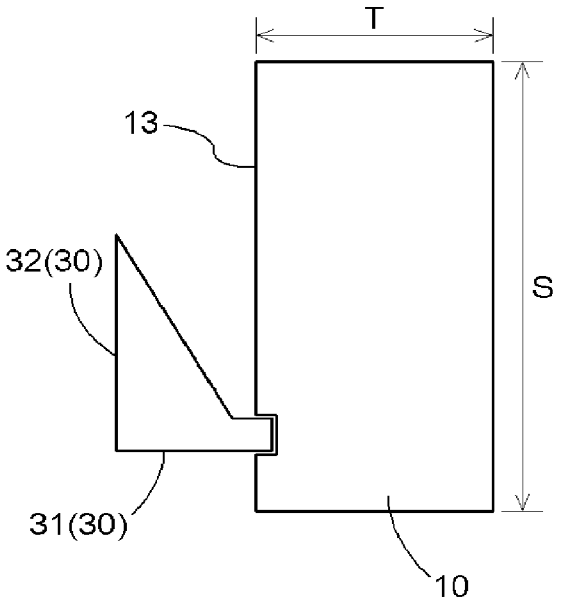
FIG. 7 is a plan view of an antenna device according to another embodiment.

In the above embodiments, a length of the ground portion 10 along the second direction B is greater than a length of the ground portion 10 along the first direction A, but a length of the ground portion 10 along the second direction B may be equal to or smaller than half of a length of the ground portion 10 along the first direction A as shown in FIG. 7. For example, when a wavelength corresponding to the highest frequency in the frequency band used in the antenna device 1 is λ, and a length T of the ground portion 10 along the second direction B is 0.17λ, a length S along the first direction A may be equal to or greater than 0.34λ. In this case, the ground portion 10 may not include the protruding portion 17.

FIGS. 8A to 8D show charge distribution generated between the ground portion 10 and the element portion 30 when power is fed to the ground portion 10 and the element portion 30 in the antenna device 1 formed as described above.

Figures 8A, 8B, 8C, 8D:
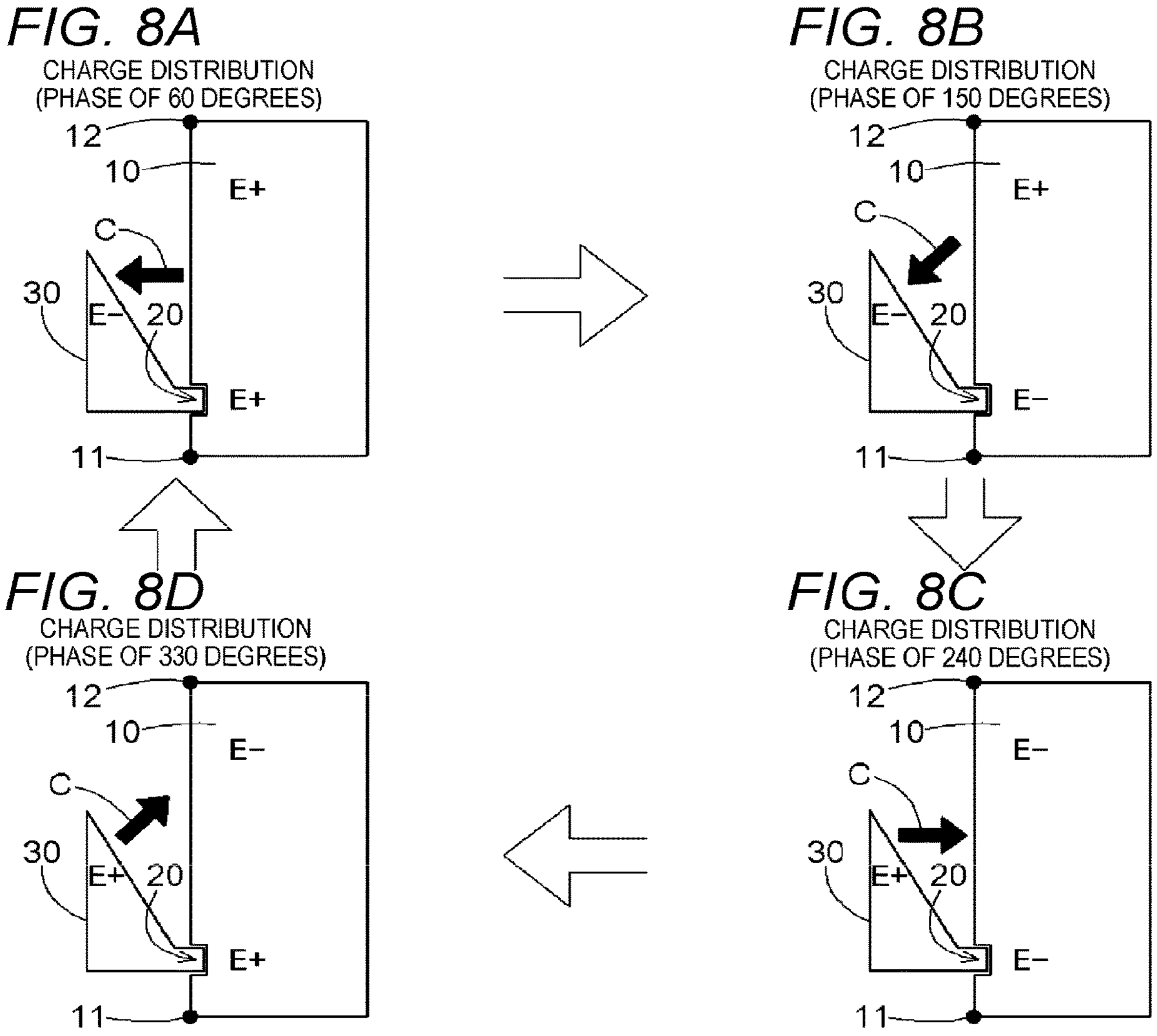
FIGS. 8A to 8D are diagrams showing radio waves radiated by the antenna device according to the other embodiment.

FIG. 8A shows the charge distribution when a phase of the AC power is 60 degrees. In this case, the entire ground portion 10 is positively charged, and the element portion 30 is negatively charged. Therefore, an electric field in a direction from the ground portion 10 toward the element portion 30 is generated between the ground portion 10 and the element portion 30 as indicated by the arrow C.

FIG. 8B shows the charge distribution when the phase of the AC power is 150 degrees. In this case, a portion of the ground portion 10 on a side (second point 12 side) far from the power feeding portion 20 is positively charged, and a portion of the ground portion 10 on a side (first point 11 side) close to the power feeding portion 20, and the element portion 30 are negatively charged. Therefore, an electric field in a direction from the portion of the ground portion 10 on the side (second point 12 side) far from the power feeding portion 20 toward the element portion 30 is generated between the portion of the ground portion 10 on the side far from the power feeding portion 20, and the element portion 30 as indicated by the arrow C.

FIG. 8C shows the charge distribution when the phase of the AC power is 240 degrees. In this case, the element portion 30 is positively charged, and the entire ground portion 10 is negatively charged. Therefore, an electric field in a direction from the element portion 30 toward the ground portion 10 is generated between the element portion 30 and the ground portion 10 as indicated by the arrow C.

FIG. 8D shows the charge distribution when the phase of the AC power is 330 degrees. In this case, the portion of the ground portion 10 on the side (first point 11 side) close to the power feeding portion 20, and the element portion 30 are positively charged, and a portion of the ground portion 10 on the side (second point 12 side) far from the power feeding portion 20 is negatively charged. Therefore, an electric field in a direction from the element portion 30 toward the portion of the ground portion 10 on the side (second point 12 side) far from the power feeding portion 20 is generated between the element portion 30 and the portion of the ground portion 10 on the side far from the power feeding portion 20 as indicated by the arrow C. By continuously feeding such AC power, an electric field rotating about an axis along a direction orthogonal to both the first direction A and the second direction B as a rotation axis can be generated from the substrate 2, and circularly polarized radio waves can be transmitted and received as shown in FIG. 4A.

In the above embodiments, each size of the antenna device 1 is described using the wavelength A corresponding to the highest frequency in the frequency band used in the antenna device 1, which is only an example, and other values may be set.

In the above embodiments, the length of the protruding portion 17 along the first direction A is 0.03λ, and the length of the protruding portion 17 along the second direction B is 0.11λ. For example, a length of the protruding portion 17 along the first direction A may be 0.03λ and a length of the protruding portion 17 along the second direction B may be 0.23λ, or a length of the protruding portion 17 along the first direction A may be 0.085λ and a length of the protruding portion 17 along the second direction B may be 0.23λ. In this case, a distance between the protruding portion 17 and the element portion 30 may be 0.2λ or smaller (preferably 0.02λ to 0.07λ).

This disclosure can be applied to an antenna device.

A characteristic configuration of an antenna device according to this disclosure is an antenna device including: a ground portion including a linear portion connecting a first point and a second point to each other along a predetermined first direction parallel to a surface of a substrate, the ground portion being formed by grounding a conductor portion of the substrate on one side in a second direction orthogonal to the first direction and parallel to the surface of the substrate; a power feeding portion provided in a first range including the first point among the first range, a second range, and a third range that are obtained by dividing the linear portion of the ground portion into three equal parts along the first direction; and an element portion configured to receive power from the power feeding portion and formed in a conductor portion of the substrate that is insulated from the ground portion in a state in which the element portion protrudes from the first range toward the other side in the second direction with respect to the linear portion. The element portion includes a first element portion protruding from the linear portion in the first range toward the other side in the second direction, and a second element portion extending along the first direction from the first element portion toward the second point, spaced apart from the linear portion toward the other side in the second direction, and having at least one linear side.

According to such a characteristic configuration, it is possible to generate a difference between charge distribution in the ground portion including a conductor portion of the substrate and charge distribution in the element portion including another conductor portion of the substrate, the ground portion including the linear portion and being provided on the one side in the second direction, according to a phase of the power fed by the power feeding portion, and to generate an electric field rotating about an axis along a direction orthogonal to both the first direction and the second direction parallel to the surface of the substrate as a rotation axis based on the difference in the charge distribution. Therefore, it is possible to implement a small antenna device that can be used for transmission and reception of circularly polarized radio waves.

It is preferable that the ground portion includes a protruding portion protruding from a second point side of the linear portion toward the other side in the second direction with a predetermined width, and the second element portion extends from the first element portion toward the protruding portion.

According to this configuration, when there is a difference between the charge distribution in the ground portion including the linear portion and provided on the one side in the second direction, and the charge distribution in the element portion, according to the phase of the power fed by the power feeding portion, it is possible to generate the electric field between the ground portion including the linear portion and provided on the one side in the second direction, and the element portion. When there is a difference between charge distribution in the protruding portion and charge distribution in the element portion according to a phase of the power fed by the power feeding portion, it is possible to generate an electric field between the protruding portion and the element portion. Therefore, the circularly polarized radio waves can be more easily transmitted and received with the direction orthogonal to both the first direction and the second direction as an axis.

It is preferable that a length of the ground portion along the second direction is greater than a length of the ground portion along the first direction.

According to such a configuration, it is possible to easily generate a difference between charge distribution in the ground portion including the linear portion and provided on the one side in the second direction, and charge distribution in the protruding portion, according to a phase of the power fed by the power feeding portion. Therefore, it is possible to generate an electric field between the ground portion and the element portion and between the protruding portion and the element portion, the ground portion including the linear portion and being provided on the one side in the second direction, according to the phase of the power fed by the power feeding portion, and the circularly polarized radio waves can be more easily transmitted and received with the direction orthogonal to both the first direction and the second direction as the axis.

Alternatively, a length of the ground portion along the second direction may be equal to or smaller than half of a length of the ground portion along the first direction.

Even in such a configuration, it is possible to generate the difference between the charge distribution in the ground portion including the linear portion and provided on the one side in the second direction, and the charge distribution in the element portion, based on the power fed by the power feeding portion, and to generate the electric field between the ground portion including the linear portion and provided on the one side in the second direction, and the element portion. Therefore, the size of the antenna device capable of transmitting and receiving the circularly polarized radio waves can be further reduced.

It is preferable that the second element portion is formed to be gradually spaced apart from the linear portion as the second element portion approaches the second point from the first element portion.

With such a configuration, it is possible to reduce influence of the charge distribution in the ground portion including the linear portion and provided on the one side in the second direction on the charge distribution in the element portion. Therefore, it is possible to easily generate the electric field between the ground portion including the linear portion and provided on the one side in the second direction, and the element portion.

It is preferable that the second element portion includes a reduced width portion in which a width along an orthogonal direction orthogonal to an extending direction of the second element portion extending from the first element portion gradually decreases as the second element portion approaches the second point from the first element portion.

With such a configuration, it is possible to more easily reduce the influence of the charge distribution in the ground portion including the linear portion and provided on the one side in the second direction on the charge distribution in the element portion. It is possible to vary, in the element portion, an antenna length formed between a power feeding point at which the power is fed by the power feeding portion and a distal end portion of the second element portion closest to the second point. Therefore, it is possible to widen a band of radio waves that can be transmitted and received.

It is preferable that the second element portion further includes a constant width portion electrically connected to the reduced width portion on the second point side of the reduced width portion and having a constant width.

Even with such a configuration, it is possible to vary, in the element portion, the antenna length formed between the power feeding point at which the power is fed by the power feeding portion and the distal end portion of the second element portion closest to the second point.

It is preferable that the first element portion has a rectangular shape in a plan view, and the second element portion has a triangular shape in the plan view.

With such a configuration, the element portion can be easily processed.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

What is claimed is:

1. An antenna device comprising:

a ground portion including a linear portion connecting a first point and a second point to each other along a predetermined first direction parallel to a surface of a substrate, the ground portion being formed by grounding a conductor portion of the substrate on one side in a second direction orthogonal to the first direction and parallel to the surface of the substrate;

a power feeding portion provided in a first range including the first point among the first range, wherein the first range, a second range, and a third range that are obtained by dividing the linear portion of the ground portion into three equal parts along the first direction; and an element portion configured to receive power from the power feeding portion and formed in a conductor portion of the substrate that is insulated from the ground portion in a state in which the element portion protrudes from the first range toward an other side in the second direction with respect to the linear portion, wherein the element portion includes a first element portion protruding from the linear portion in the first range toward the other side in the second direction, and a second element portion extending along the first direction from the first element portion toward the second point, spaced apart from the linear portion toward the other side in the second direction, and having at least one linear side, and wherein the first element portion is formed in a rectangular shape and the second element portion is formed in a right-angled triangular shape, and a right-angled corner portion of the second element portion coincides with a corner portion of the rectangular first element portion on outer edge portion sides of the substrate.

2. The antenna device according to claim 1, wherein the ground portion includes a protruding portion protruding from a second point side of the linear portion toward the other side in the second direction with a predetermined width, and the second element portion extends from the first element portion toward the protruding portion.

3. The antenna device according to claim 2, wherein a length of the ground portion along the second direction is greater than a length of the ground portion along the first direction.

4. The antenna device according to claim 1, wherein a length of the ground portion along the second direction is equal to or smaller than half of a length of the ground portion along the first direction.

5. The antenna device according to claim 1, wherein the second element portion is formed to be gradually spaced apart from the linear portion as the second element portion approaches the second point from the first element portion.

6. The antenna device according to claim 5, wherein the second element portion includes a reduced width portion in which a width along an orthogonal direction orthogonal to an extending direction of the second element portion extending from the first element portion gradually decreases as the second element portion approaches the second point from the first element portion.

7. The antenna device according to claim 6, wherein the second element portion further includes a constant width portion electrically connected to the reduced width portion on the second point side of the reduced width portion and having a constant width.

8. The antenna device according to claim 1, wherein the first element portion has the rectangular shape in a plan view, and the second element portion has the triangular shape in the plan view.

* * * * *